United States Patent [19]

Kaneno et al.

[11] 4,182,972
[45] Jan. 8, 1980

[54] TRANSPARENT POLYCRYSTALLINE ALUMINA AND HIGH PRESSURE VAPOR DISCHARGE LAMP

[75] Inventors: Masayuki Kaneno, Tokoname; Isao Oda; Noboru Yamamoto, both of Nagoya, all of Japan

[73] Assignee: NGK Insulators, Ltd., Nagoya, Japan

[21] Appl. No.: 883,785

[22] Filed: Mar. 6, 1978

[30] Foreign Application Priority Data

Mar. 10, 1977 [GB] United Kingdom ............... 10198/77

[51] Int. Cl.$^2$ ...................... H01J 17/16; C04B 35/10; C04B 35/50
[52] U.S. Cl. ................... 313/221; 106/73.4; 106/73.2
[58] Field of Search ............. 106/73.2, 73.4; 313/221

[56] References Cited

U.S. PATENT DOCUMENTS

| | | | |
|---|---|---|---|
| 3,026,210 | 3/1962 | Coble | 106/73.4 |
| 3,769,049 | 10/1973 | Muta et al. | 106/73.4 |
| 3,792,142 | 2/1974 | Kobayashi et al. | 106/73.4 |
| 3,846,146 | 11/1974 | Hunting et al. | 106/73.4 |
| 3,875,277 | 4/1975 | Bratton et al. | 106/73.4 |

*Primary Examiner*—Delbert E. Gantz
*Assistant Examiner*—Mark Bell
*Attorney, Agent, or Firm*—Lewis H. Eslinger

[57] ABSTRACT

A polycrystalline alumina has at least 50% unit surface area provided by crystals of at least 60 μm, and preferably 100 μm size. This improves the in-line transmission value and hence lamp efficiency in a tube for a high pressure metal vapor lamp having an envelope of alumina.

4 Claims, 6 Drawing Figures

FIG_1
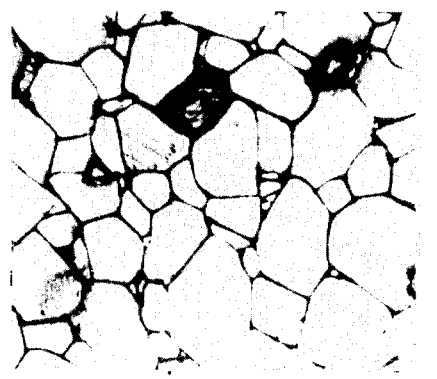
100μ
FIG_2
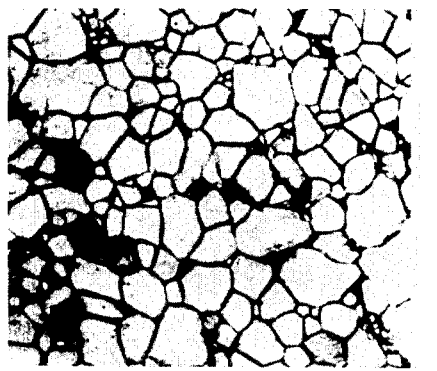
100μ
FIG_3
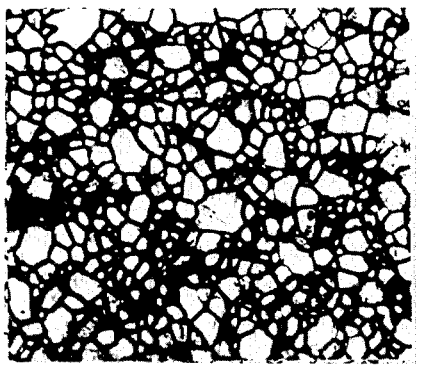
100μ

TRANSPARENT POLYCRYSTALLINE ALUMINA AND HIGH PRESSURE VAPOR DISCHARGE LAMP

This invention relates to transparent polycrystalline alumina, and to a high pressure vapor discharge lamp using the polycrystalline alumina as a tubular discharge envelope thereof.

It has been proposed, in U.S. Pat. No. 3,026,210, to prepare transparent polycrystalline alumina by mixing finely divided alumina with a small amount of magnesia and firing the mixture in a hydrogen atmosphere at a temperature not lower than about 1700° C., preferably 1800 to 1950° C. It has also been proposed, in U.S. Pat. No. 3,792,142, to use $Y_2O_3$ and $La_2O_3$ in addition to MgO, with the object of lowering the required firing or sintering temperature. However, polycrystalline aluminas prepared according to the teachings of these Patents display a low in-line transmission value, so that when these aluminas are used in high pressure vapor discharge lamps, the lamp efficiency (lumens/watt, which will be referred to simply as lm/w hereinafter) is unsatisfactorily low.

According to the present invention there is provided a transparent polycrystalline alumina wherein alumina crystals having a size of at least 60 μm occupy not les than 50% of unit surface area.

More particularly the invention provides a transparent polycrystalline alumina wherein alumina crystals having a size of at least 100 μm occupy not less than 50% of unit surface area.

In contrast with transparent polycrystalline aluminas of the prior art, transparent polycrystalline aluminas according to the present invention display a high value of in-line transmission, which leads to good lamp efficiency when used in a tubular discharge envelope for a high pressure vapor discharge lamp. This notable improvement arises, unexpectedly, from making the size of crystals of the polycrystalline alumina relatively uniform and large, compared to transparent polycrystalline aluminas of the prior art where the alumina crystals are less than 50 microns in average size. Moreover, we have been surprised to find that, when considering the proportion of a unit surface occupied by crystals of at least 60, or as is the case may be 100, microns dimension, the lamp efficiency increases very rapidly in the range of 50%, which is therefore the lower limit according to the invention. The size of crystals referred to is the length of the major axis as obtained by microscopic observation.

In another aspect, the present invention provides a high pressure vapor lamp having a transparent polycrystalline alumina tube wherein alumina crystals having a size of at least 60 μm occupy not less than 50% of unit surface area.

The transparent polycrystalline alumina according to the invention can be prepared as follows. First, powder of γ-alumina having a purity of not lower than 99.5% and a particle size of 0.01–0.1μ is added with 0.01–0.2% of MgO, 0.01–0.2% of $Y_2O_3$ and 0.01–0.2% of $La_2O_3$ (percentages are herein based on the weight of the alumina powder employed) each in the form of a nitrate, which is then wet mixed with a ball mill for 10 hours. The resulting mixture is taken out from the ball mill, dried and calcined in air at a temperature of 1200°–1250° C. for 3–7 hours. Alternately, α-alumina powder having a grain size of 0.1–0.5 μm may be used as the alumina starting material, instead of γ-alumina. In this case, the calcination step may be omitted. To the powder is uniformly added 1–3 wt % of polyvinyl alcohol as a binder, and the material is molded into a tube with a length of 140 mm, an outer diameter of 11.8 mm and a thickness of 0.94 mm by a procedure using hydrostatic pressure. If desired, the molded body may be surface-processed by a lathe or other suitable means.

Then, the molded body is heated in air at about 700° C. for 3 hours to remove the binder and then sintered in a hydrogen atmosphere. The sintering is conducted in a two step process; the first sintering step is performed at 1300°–1400° C. for 2–5 hours and the second sintering at 1700°–1800° C. for 5 hours or longer. The resulting tube of sintered alumina is found to be 114 mm in length, 9.50 mm in outer diameter and 0.8 mm in thickness.

For testing purposes, twelve sintered tubes were prepared in a manner as described above and as shown in Table 1. For reference, there were also prepared three tubes; two in which crystals having a size of at least 60 μm occupied less than 50% of the sintered surface and another produced by a conventional process. The average crystal size in Table 1 was determined on the basis of the crystals appearing on the surfaces of the sintered body. Observation of the cross-sectional area of the sintered body revealed that the crystal size within the inside is substantially the same as that on the surfaces. As noted from Table 1, the percent in-line transmission of the prior art article is 0.3%, whereas that of the polycrystalline alumina according to the invention is in the range of 3.1–7.3%. More especially, tubes wherein the alumina crystals having a size of at least 100 μm occupy 50% or more have an excellent in-line transmission of higher than 4.9%.

The in-line transmission value was determined using a tube divided along a axial plane, and is defined as the ratio of the amount of radiant energy of transmitted light to the amount of radiant energy of incident light when a ray having a wavelength of 600 nm (nanometer) is radiated from the concave side of the divided tube. Measurements were conducted on a Spectrophotometer Model 323 produced by Hitachi, Ltd. This Spectrophotometer uses a tungsten lamp as the light source and a photomultiplier as the light receiving means.

Table 1

|  | Sample No. | Percentage of occupation of crystals with a size of at least .60μ on surface of sintered body | Percentage of occupation of crystals with a size of at least 100μ on surface of sintered body | Average crystal size | Percent in-line transmission |
| --- | --- | --- | --- | --- | --- |
|  | 1 | 96% | 95% | 40μ | 8.3% |
|  | 2 | 94 | 93 | 136 | 7.1 |
|  | 3 | 87 | 85 | 130 | 6.9 |
|  | 4 | 84 | 82 | 129 | 6.8 |
| Invention | 5 | 81 | 78 | 124 | 6.2 |
|  | 6 | 74 | 71 | 120 | 6.0 |
|  | 7 | 68 | 63 | 115 | 5.3 |

Table 1-continued

|  | Sample No. | Percentage of occupation of crystals with a size of at least .60μ on surface of sintered body | Percentage of occupation of crystals with a size of at least 100μ on surface of sintered body | Average crystal size | Percent in-line transmission |
|---|---|---|---|---|---|
|  | 8 | 68 | 63 | 115 | 5.3 |
|  | 9 | 64 | 59 | 111 | 5.1 |
|  | 10 | 59 | 52 | 103 | 4.9 |
|  | 11 | 54 | 46 | 80 | 3.8 |
|  | 12 | 51 | 41 | 71 | 3.1 |
| Comparison | 13 | 34 | 10 | 40 | 1.8 |
|  | 14 | 23 | 8 | 32 | 1.6 |
| Prior Art | 15 | 0 | 0 | 21 | 0.3 |

Shown in Table 2 below is the lamp efficiency of each of the transparent polycrystalline alumina sintered bodies as indicated in Table 1 when used as a tubular envelope for a 400 W high pressure sodium lamp. The lamp efficiency was calculated by dividing, by 400, the total luminous flux (lumens) produced upon putting a load of 400 W on the lamp. The total luminous flux was measured with the aid of an integrating sphere of a diameter of 1.5 m coated with MgO on the inner surace thereof. A standard incandescent lamp was used as a standard lamp for correcting the spectrum distribution of the high pressure sodium lamp.

Table 2

|  | Sample No. | Percentage of occupation of crystals with a size of at least .60μ on surface of sintered body | Percentage of occupation of crytals with a size of at least 100μ on surface of sintered body | Average crystal size | Lamp efficiency |
|---|---|---|---|---|---|
|  | 1 | 96% | 95% | 140μ | 130 lm/W |
|  | 2 | 94 | 93 | 136 | 130 |
|  | 3 | 87 | 85 | 130 | 129 |
|  | 4 | 84 | 82 | 129 | 129 |
| Invention | 5 | 81 | 78 | 124 | 129 |
|  | 6 | 74 | 71 | 120 | 128 |
|  | 7 | 69 | 65 | 118 | 127 |
|  | 8 | 68 | 63 | 115 | 127 |
|  | 9 | 64 | 59 | 111 | 126 |
|  | 10 | 59 | 52 | 103 | 125 |
|  | 11 | 54 | 46 | 80 | 124 |
|  | 12 | 51 | 41 | 71 | 122 |
| Comparison | 13 | 34 | 10 | 40 | 118 |
|  | 14 | 23 | 8 | 32 | 118 |
| Prior Art | 15 | 0 | 0 | 21 | 117 |

The accompanying drawings are provided further to illustrate the invention. In these drawings:

FIGS. 1 and 2 are representations of the surfaces of sintered tubes made of transparent polycrystalline alumina according to the invention;

FIG. 3 is a representation of the surface of a sintered tube made of a previously known transparent polycrystalline alumina;

Figure 4:
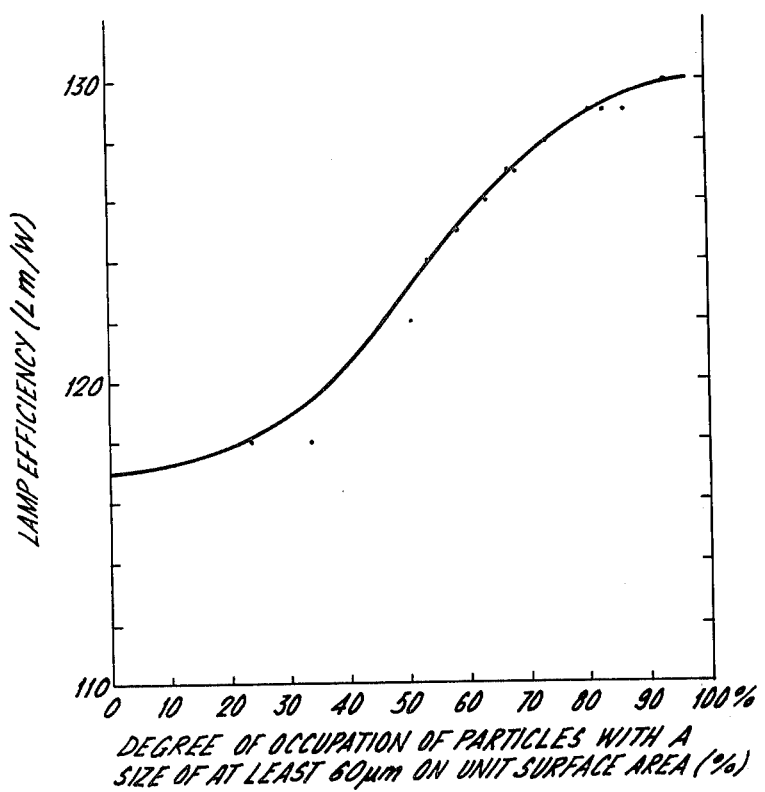
Figure 5:
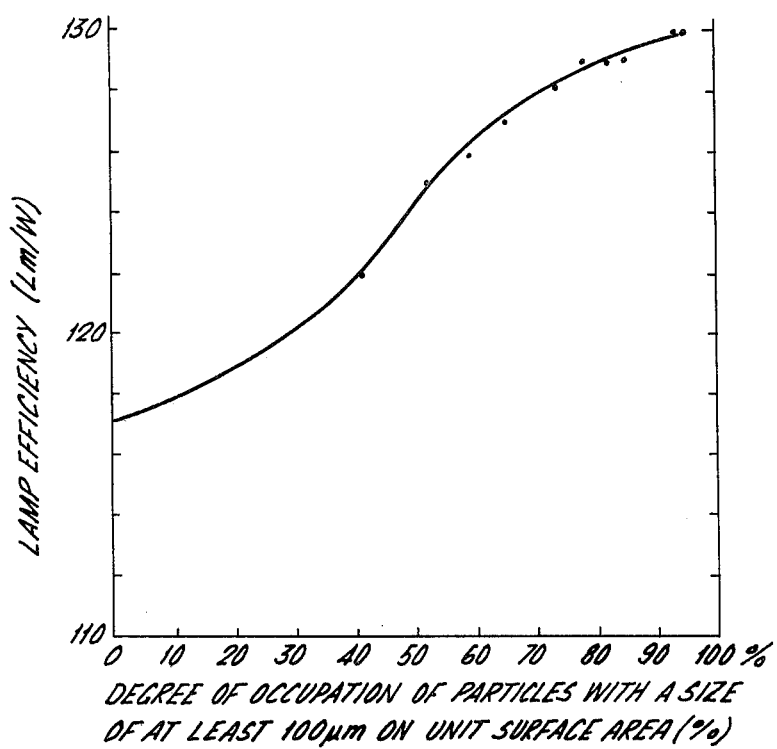
Figure 6:
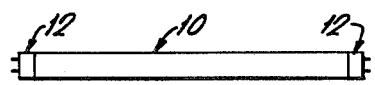

FIGS. 4 and 5 are graphs showing the relationship between the degree of occupation of crystals with sizes of at least 60 μm and 100 μm respectively on the surface of transparent polycrystalline sintered alumina and the lamp efficiency of a high pressure sodium lamp using the alumina as discharge tube; and FIG. 6 is an overall view of a high pressure vapor lamp according to the invention.

FIGS. 1 and 2 show microstructures of the surface of transparent polycrystalline sintered aluminas according to the invention. FIG. 3 shows, for comparison, the microstructure of the surface of a polycrystalline alumina in which only 40% of unit surface area is occupied by crystals having a size of at least 60 μm. The microstructures shown in FIGS. 1 and 2 are predominantly composed of relatively large-sized crystals of at least 60 μm, while the microstructure of FIG. 3 is composed of a minor proportion of larger-sized crystals and a major proportion of smaller-sized crystals. The polycrystalline aluminas according to the invention have a reduced grain boundary area with an improved percent in-line transmission as indicated in Table 1, as a result of which the lamp efficiency is improved as demonstrated in Table 2.

FIGS. 4 and 5 show the relationship, respectively, between the degree of occupation of particles with a size of at least 60 μm and 100 μm on unit surface area and the lamp efficiency, revealing that with the occupation percentage of 60 μm crystals, above 50%, the lamp efficiency reaches 122 lm/w or more. For the occupation percentage of alumina crystals of at least 100 μm above 50%, the lamp efficiency is at least 125 lm/w. Thus, the present invention is based on the findings that the polycrystalline alumina having the occupation percentage of alumina crystals of at least 60 μm, and preferably 100 μm, not less than 50% exhibits improved in-line transmission, and thus improved lamp efficiency. This may be due to reductions in light scattering at the grain boundary and irregular reflections at the surfaces. These Figures demonstrate that there is a rapid improvement in the region of 50%, this being the lower limit according to the invention.

The transparent polycrystalline aluminas according to the invention are very suitable for use in tubular discharge envelopes for high pressure vapor discharge lamps, particularly a high pressure sodium lamp. One such lamp is illustrated in FIG. 6 and comprises a tubular discharge envelope 10 with two sealed electrodes 12 at its ends. It contains an ionizing medium for discharging. When the transparent polycrystalline alumina of the invention is used to make a tubular discharge envelope for a high pressure vapor discharge lamp, the sealing is feasible by several methods: (1) a method wherein sealing is effected with use of a niobium closure cap in combination with the method as disclosed in British Pat. No. 1,475,866; (2) a method wherein a closure cap made of $Al_2O_3$ to be the same material as of the envelope is used for sealing, e.g. sealing is effected with the use of oxides as taught in Japanese Patent Publication. No. 48-37730; and (3) a method wherein $Al_2O_3$ caps are incorporated with a green body of the envelope at both ends so that they form a unitary body upon firing. Of these, the method (1) is most preferable.

We claim:

1. A transparent polycrystalline alumina comprising alumina crystals wherein the alumina consists of 0.01 to 0.2% MgO, 0.01 to 0.2% $La_2O_3$, 0.01 to 0.2% $Y_2O_3$, the balance being alumina and the percentages being by weight of alumina, and wherein crystals having a size of at least 60 μm occupy not less than 50% of unit surface area.

2. A transparent polycrystalline alumina comprising alumina crystals wherein the alumina consists of 0.01 to 0.2% MgO, 0.01 to 0.2% $La_2O_3$, 0.01 to 0.2% $Y_2O_3$, the balance being alumina and the percentages being by weight of alumina, and wherein crystals having a size of at least 100 μm occupy not less than 50% of unit surface area.

3. A high pressure vapor discharge lamp comprising a tubular discharge envelope, two sealed electrodes at respective ends of the envelope, and an ionizing medium within the envelope, the envelope comprising a transparent polycrystalline alumina tube wherein crystals of alumina having a size of at least 60 μm occupy not less than 50% of unit surface area, and wherein the alumina tube consists of 0.01 to 0.2% MgO, 0.01 to 0.2% $La_2O_3$, 0.01 to 0.2% $Y_2O_3$, the balance being alumina and the percentages being by weight of alumina.

4. A high pressure discharge lamp comprising a tubular discharge envelope, two sealed electrodes at respective ends of the envelope, and an ionizing medium within the envelope, the envelope comprising a tranparent polycrystalline alumina tube wherein crystals of alumina having a size of at least 100 μm occupy not less than 50% of unit surface area, ad wherein the alumina tube consists of 0.01 to 0.2% MgO, 0.01 to 0.2% $La_2O_3$, 0.01 to 0.2% $Y_2O_3$, the balance being alumina and the percentages being by weight of alumina.

* * * * *